United States Patent
Chien (10) Patent No.: US 11,239,667 B2
(45) Date of Patent: Feb. 1, 2022

(54) DESKTOP ITEM WITH LED MEANS HAS USB-UNIT(S) OR USB-MODULE TO CHARGE OTHER ELECTRIC OR DIGITAL DATA DEVICE(S)

(71) Applicant: Tseng-Lu Chien, Walnut, CA (US)

(72) Inventor: Tseng-Lu Chien, Walnut, CA (US)

( * ) Notice: Subject to any disclaimer, the term of this patent is extended or adjusted under 35 U.S.C. 154(b) by 0 days.

(21) Appl. No.: 14/144,703

(22) Filed: Dec. 31, 2013

(65) Prior Publication Data
US 2014/0218927 A1    Aug. 7, 2014

Related U.S. Application Data

(63) Continuation of application No. 13/161,643, filed on Jun. 16, 2011, now Pat. No. 8,783,936.

(51) Int. Cl.
*H02J 7/00* (2006.01)
*F21V 8/00* (2006.01)
(Continued)

(52) U.S. Cl.
CPC .............. *H02J 7/00* (2013.01); *F21S 6/003* (2013.01); *F21S 8/035* (2013.01); *F21V 15/01* (2013.01); *F21V 23/02* (2013.01); *F21V 23/023* (2013.01); *F21V 23/06* (2013.01); *F21V 33/00* (2013.01); *F21V 33/0004* (2013.01); *F21V 33/0024* (2013.01); *F21V 33/0048* (2013.01); *F21V 33/0056* (2013.01); *G02B 6/0045* (2013.01); *G04B 19/30* (2013.01); *G06F 1/266* (2013.01); *G09F 23/00* (2013.01); *H01R 13/6691* (2013.01); *H01R 25/006* (2013.01); *H02G 3/14* (2013.01); *H02J 4/00* (2013.01); *H02J 7/007* (2013.01); *H02J 7/0042* (2013.01); *H02J 7/0047* (2013.01); *F21V 23/0442* (2013.01); *F21V 33/006* (2013.01); *F21W 2121/00* (2013.01); *F21Y 2115/10* (2016.08); *G02B 6/0021* (2013.01); *H01H 2009/186* (2013.01); *H01R 13/713* (2013.01); *H01R 24/76* (2013.01); *H01R 2103/00* (2013.01); *H02J 2207/20* (2020.01)

(58) Field of Classification Search
CPC . F21S 8/0035; G02B 6/0045; H01R 13/6691; H01R 2009/184
USPC .................. 362/95, 157, 641; 320/114, 137; 363/142, 146
See application file for complete search history.

(56) References Cited

U.S. PATENT DOCUMENTS 4,868,369 A * 9/1989 Chen ................. B23K 3/00
                                                219/242
5,347,211 A * 9/1994 Jakubowski ............ G05F 1/575
                                                323/281
(Continued)

FOREIGN PATENT DOCUMENTS

CN        201078619 Y      6/2008
CN        201078619 Y      6/2008

OTHER PUBLICATIONS

Daniel, Quirky Ember Portable Study Lamp with USB Ports Power Outlets, Jan. 28, 2011.*

*Primary Examiner* — Anabel Ton
(74) *Attorney, Agent, or Firm* — Bacon & Thomas, PLLC (57) ABSTRACT

Desk top items with LEDs also include USB-unit(s) or USB-module(s) and, optionally, additional outlet-units, to supply power to other electric or digital devices such as a smart phone or digital data device.

13 Claims, 10 Drawing Sheets

(51) Int. Cl.
  *H01R 13/66* (2006.01)
  *H01R 25/00* (2006.01)
  *H02G 3/14* (2006.01)
  *F21V 33/00* (2006.01)
  *F21V 15/01* (2006.01)
  *H02J 4/00* (2006.01)
  *F21V 23/06* (2006.01)
  *H01R 13/713* (2006.01)
  *H01R 24/76* (2011.01)
  *G09F 23/00* (2006.01)
  *F21V 23/02* (2006.01)
  *G04B 19/30* (2006.01)
  *G06F 1/26* (2006.01)
  *F21S 6/00* (2006.01)
  *F21S 8/00* (2006.01)
  *F21V 23/04* (2006.01)
  *F21W 121/00* (2006.01)
  *H01H 9/18* (2006.01)
  *H01R 103/00* (2006.01)
  *F21Y 115/10* (2016.01)

(56) References Cited

U.S. PATENT DOCUMENTS

| | | | | |
|---|---|---|---|---|
| 5,615,945 A * | 4/1997 | Tseng | ............... | F21V 21/32 362/253 |
| 6,211,581 B1 * | 4/2001 | Farrant | ............... | G06F 1/266 307/115 |
| 6,279,753 B1 * | 8/2001 | Swanson | ............... | F21V 33/002 211/1.51 |
| 6,474,823 B1 | 11/2002 | Agata et al. | | |
| 7,679,317 B2 * | 3/2010 | Veselic | ............... | G06F 1/266 320/106 |
| 7,736,033 B2 * | 6/2010 | Patel | ............... | F21S 6/002 307/43 |
| 7,742,293 B2 | 6/2010 | Strauser | | |
| 7,897,277 B2 | 3/2011 | Meyer et al. | | |
| 8,116,007 B2 | 2/2012 | Tsai | | |
| 8,432,667 B2 | 4/2013 | Strauser | | |
| 8,545,039 B2 | 10/2013 | Patel | | |
| 8,562,187 B2 * | 10/2013 | Smed | ............... | F21S 6/003 315/291 |
| 8,687,392 B2 * | 4/2014 | Sims | ............... | H02M 7/02 363/125 |
| 8,758,031 B2 | 6/2014 | Cheng et al. | | |
| 8,783,936 B2 * | 7/2014 | Chien | ............... | F21S 8/035 362/157 |
| 8,853,884 B2 * | 10/2014 | genannt Berghegger | ............... | H02J 9/005 307/125 |
| 8,899,797 B2 | 12/2014 | Schaak | | |
| 9,103,543 B2 * | 8/2015 | Marquardt | ............... | F21V 21/26 |
| 9,125,462 B2 * | 9/2015 | Akin | ............... | A45B 25/00 |
| 9,163,816 B2 * | 10/2015 | Baschnagel | ............... | H01R 33/9453 |
| 2004/0012344 A1 * | 1/2004 | Bibi | ............... | H05B 37/0254 315/291 |
| 2005/0225287 A1 * | 10/2005 | Yang | ............... | H02J 7/0044 320/114 |
| 2006/0209530 A1 * | 9/2006 | Schaak | ............... | F21S 6/003 362/86 |
| 2006/0221017 A1 * | 10/2006 | Fang | ............... | G09F 9/30 345/83 |
| 2008/0012423 A1 * | 1/2008 | Mimran | ............... | H01R 25/003 307/11 |
| 2010/0039792 A1 * | 2/2010 | Meyers | ............... | F21L 2/00 362/20 |
| 2011/0177703 A1 | 7/2011 | Lin | | |
| 2012/0287611 A1 * | 11/2012 | Wilson | ............... | F21L 2/00 362/183 |
| 2014/0016331 A1 * | 1/2014 | Ting | ............... | F21V 33/0052 362/382 |

* cited by examiner

DESKTOP ITEM WITH LED MEANS HAS USB-UNIT(S) OR USB-MODULE TO CHARGE OTHER ELECTRIC OR DIGITAL DATA DEVICE(S)

This application is a continuation of U.S. patent application Ser. No. 14/444,703, filed Dec. 31, 2013, which is a continuation of U.S. patent application Ser. No. 13/161,643, filed Jun. 16, 2011, and now U.S. Pat. No. 8,783,936, each of which is incorporated by reference herein.

BACKGROUND OF THE INVENTION

This application is having subject matter in common with the inventor's U.S. patent application Ser. No. 13/117,227, filed on May 30, 2011, and entitled "Universal module of USB-unit or Outlet-units for electric or digital data device(s)."

This application also has subject matter in common with the inventor's U.S. patent application Ser. Nos. 12/502,661, 12/292,580, 12/566,322, 11/498,874, 11/527,629, 12/622,000, 12/624,621, which disclose a sealed-unit with uniform dimensions and shape to fit into the same uniformly dimensioned compartment so that the universal sealed-unit can fit into a variety of LED light devices. The sealed unit(s) disclosed in these applications share the following features:

a. The sealed-unit(s) has uniform dimensions to fit into the uniform compartment of any kind of LED light device.
b. The sealed-unit(s) has passed all related safety standards and received a laboratory's safety certification so that it can be used with other LED light device's parts and accessories which may or may not meet the safety standard passed by the said sealed-unit(s).
c. The sealed-unit(s) can be any individually salable unit because it has passed all related safety requirements and standards. The other parts or accessories may or may not be just decorative or have other functions to make the LED light device more valuable.

The current invention utilizes the sealed-unit concept in the following manner:

(1) The current invention utilizes the concept disclosed in the above-cited applications of providing a sealed-unit that has passed all the relevant safety standards but applies the concept to other electric device(s) which are not limited to an LED light device. The concept may be applied to an LED light device, power strip device, wall outlet device, surge protection device, wall adaptor device, charging device(s), smart phone related device(s), computer related device(s), and other consumer electric device(s).

(2) The sealed-unit may be in the form of a USB-unit or outlet-unit rather than the previously disclosed LED-unit, battery-pack, or prong-means.

(3) The USB-unit or outlet-unit both may be arranged to supply power from these units to a variety of electric devices to keep the electric device(s) in good power condition for people to use.

(4) The USB-unit or outlet-unit may each include its own related circuit-means, conductive-means, contact-means, receiving-means, output-ends, input-ends, electric parts and accessories to supply electric power from a prong-cable means or USB-cable means to a receiving-means for supplying power to a variety of electric device(s).

(5) The current invention offers a universal design for the USB-unit or outlet-unit with the most compact size to enable each of the USB-unit and outlet-unit or any combination of USB-units and/or outlet-units to form a desired module that fits into all kinds of electric device(s), including an LED light device, wall outlet, wall outlet adaptor, power strips, surge protector, communication device, computer device, consumer electric device, smart phone device, panel computer device, etc.

(6) Once the USB-unit or outlet-unit has passed all related safety standards and has its own issued certification, the finished electric device in which it is used does not need to get an additional safety certification related to USB-units or outlet-units.

(7) The modules of the current invention can utilize any combination of suitable USB-unit or outlet-unit parts, such as a conductive wire, conductive plate, conductive means, contact-means, prong-cable means, USB-cable means, prong-means, resilient conductive means, printed circuit means, flexible circuit means, related electric parts and accessories, fixing means, positioning means, and/or installation means to enable the module, outlet-unit, or USB-unit to pass the safety standard and get the relevant safety certification and be added onto another electric device.

(8) The module of the current invention may have different specifications, such as:

1 USB-unit with 1 USB-port,
1 USB-unit with 2 USB-ports+1 outlet-unit,
1 USB-unit with 2 USB-ports+2 outlet-units,
1 outlet-unit.
or
any combination of USB-units and outlet-units that still permits a standard module to fit into different electric device(s) as needed.

(9) The module can also have the following different specifications:

2 USB ports having different current outputs including 500 ma, 1 Amp, 1.1 Amp, and/or 2.2 Amps to enable the 2 USB-ports to charge different electric devices such as an iPhone™, which needs to have 1 Amp, and an iPad™, which requires 2.1 Amps. If people want to charge 1 iPhone™+1 iPad™ at the same time, at least 3.1 Amps will be needed, which will be very expensive. If people want to charge the 1 iPhone™ or 1 iPad™ at different times, the standard module can be 1 port 1 Amp+1 port 1.1 Amp=2.1 Amps total, and the cost will be cheaper. If people want to charge only 1 iPhone™, only need 1 USB-unit with 1 port which has only 1 Amp is needed for the most economical product. Hence, the module of the invention should not be limited to only one specification.

(10) Because the standard module, outlet-unit or USB-unit is a sealed-unit that has its own issued safety certification and that can fit into the uniform compartment of any other electric device, there is no need to file, for each different electric devices, a UL, ETL, or CSA safety certification, which saves a lot of time for tooling, development, and safety testing for each different electric device. This will reduce a lot of R&D, development, tooling, safety certification time and fees.

The copending application entitled "Universal module of USB-unit or Outlet-unit for electric or digital data device," U.S. Ser. No. 13/117,227, discloses a simple arrangement for enabling "Desk Top items with LED means having USB-unit(s) or USB-module(s) to charge a variety of electric or digital data device(s)," which does not require a universal module because some of the desk top items with LED means have plenty of room/space to accommodate a larger size of USB-unit(s) or USB-module(s) and reduce the cost for related electric components, parts, or accessories to make the items more cost attractive to the consumer. The USB-unit(s) is an electric charging unit which has a USB-female receiving means (also known as a USB port) to receive a USB-male prong (also known as a USB plug) to deliver electric power from the USB-female receiving means to the other device's USB-male prong. The preferred USB-female receiving means gets power from a power source and uses circuit means to convert the input electric power to output electric power having a desired waveform, voltage, and current flow or amperage (A or ma) to enable the USB-male means to supply power to other electric or digital device(s).

The USB-module(s) described in the copending application is an electric charging module which has at least one USB-female receiving means but also has a number of receiving means selected from an outlet-female receiving means (also known as an outlet or outlet port), USB-female receiving means, an adaptor's female receiving means (also known as an adaptor port), or any conventional female receiving means or ports to form a single body which has more than one USB-female receiving means to offer the same or different electric power though the different female receiving means within the one body. The USB-module connects with a power source and circuit-means to offer a desired waveform, voltage, and current (A or ma) to charge other device(s) when the female receiving means relates to the male prong means of each style of the connect-means.

To enable people to easily reach, touch, operate, or manage the desk top items, the USB-unit(s) or USB-module(s) are installed on or within the item or a substrate(s). The items may be positioned at a location where people will stay for a period, such as a desk, table, bed, chair, land, grass, or wherever else people work, rest, or take a nap. For example, people use a computer, laptop computer, iPhone™, iPad™, or iCloud™ on a substrate(s), location, or place such as a table, desk, bed, laptop stand, laptop supporter, laptop cushion or any similar surface(s) which allows people to work, sleep, or lay down for a period of time while charging other electric or digital data device(s).

In all such places where people will stay for period of time, the nearby desk top items with LED means and built-in USB-units easily offer electric power to all other electric or digital data device(s), so people do not need to bend the body to find a power source under the table, which normally is farther away than the desk top items having LED means. Hence, this arrangement offers good convenience for people while they work, rest, or even take a nap, so that they can easily use the USB-unit(s) or USB-module of the desk top items with LED means to charge their small phone, computer, iPad™, or any other electric or digital data device(s) while they work, rest, sleep or take a nap.

It is desirable for the universal module of the USB-unit(s) or outlet-unit(s) described in the copending application to be made as small as possible so that it can fit into as many applications' limited housing size as possible and therefore really meet the goal of universal applicability. On the other hand, the smallest, slimmest, or most compact size of the USB-unit(s), outlet-unit(s), or USB-module is too expensive. For example, the APPLE™ iPhone™'s or iPad™'s USB-unit, which is very small in size, needs to use a relatively expensive, high power transformer or inverter to achieve a very short time to fully charge the other electric or digital data device(s). This problem can be resolved if, in order to get the USB-3.0 standard 2.1 amp output from the USB-unit(s), the size of some electric components, parts, or accessories such as transformer or inverter, or other same-function electric parts, or accessories can be increased by placing it in a desk top item with sufficient space, thereby obtaining the same big power output at a substantially lower cost to let the consumer save pocket money. Suitable desk top items to which a universal module, USB-unit, or outlet-unit can be added include a desk lamp, desk top clock, desk top radio, desk top fan, desk top lighting, reading light, wall reading light, head lighting, book light, electric picture display, night light with AC to DC power source or adaptor with prong and wire means, projection light with AC to DC power source or adaptors with prong and wire means, electric candle set with AC to DC power source or adaptors with prong and wire means, or any LED device that can serve as a desk top item as described herein and that can accommodate a USB-unit or USB-ports designed only for charging purposes rather than delivery of digital data. The desk top items can provide function(s), performance, and effects(s) including, by way of example, generation of light beams and projection of images such as time images, as well as serving as a source of illumination, music, power, electric signals, photos, and digital signals for sound, light, music, smell or any conventional market-available devices that people will keep on for a period of time sufficient to also enable charging of other electric or digital data device(s).

BRIEF DESCRIPTION OF THE DRAWINGS

FIG. 14 shows desk top items with LED means having USB-unit(s), USB-module, or outlet-unit(s) to allow people to charge other electric or digital device(s), the items including for example a radio, time piece, weather station display, fruit blender, food machine, liquid machine, LED lighting, light fixture, projector, electric fan, heater or any conventional items with LED means built-in.

More specifically, FIG. 9 shows a desk lamp (9a) having a light source and two rotatable modules (9k) (9j) Each of the rotatable modules (9k) (9j) has a built-in desired number of the following:

1. USB-units (9m), and/or
2. an outlet-unit (9n), and/or
3. a USB-module (combine the 2 USB-units into one piece and in one housing or PCB), and/or
4. an outlet-module (combine the 3 outlet-units into one piece and in one housing or PCB), and/or a sealed-unit (has more than one of UBS-unit(s), and/or
5. outlet-unit(s), and/or
6. a universal-unit (at least has one USB-unit or/and outlet-units has housing to fit into uniform compartment which within many of the desk top items housing) to get desired functions. It also has a switch means to turn-on or turn-off the light source for the desk lamp or existing function of the top part of the desk top item. An LED indicator light (9p) on the one of the rotatable module's surface (9k) shows the charging status.

FIG. 10 shows a thicker and more curved base for a desktop item in the form of a desk lamp (10a) having a desired light source for illumination. The desk lamp (10a) has a wired plug (10b) (10c) to connect with a wall-outlet (not shown) and an AC 120 Volt current input into an inner circuit (not shown) to convert the wall-outlet's 120V current into a USB DC current and supply the wall-outlet's 120V current to the outlet-unit(s). The bulb, incandescent light, fluorescent light, CFL or energy saving light source is turned on or turned off by the switch (10f), sensor (10f), or remote control (10f) on the top or side surface of the base (10a).

FIG. 11 shows the base (11a) of the desktop lighting which may have any type of the light source (the top part with the light source is not shown) and a rotatable module (11f) having a desired number of USB-unit(s) and/or outlet-unit(s), and optional LEDs to show a charging status. The base (11a) not only has a rotatable module (11f) and but also has an additional outlet-unit or outlet-module(s) (11c) (11d) to allow a user to charge or supply AC power to other electric or digital devices which need AC current input to operate. The base also can have more outlet-unit(s) numbering from 1 to N number (where N can be any number) if the plurality of outlet-unit(s) can fit into the dimensions of a conventional desk top item base (11a) to replace the existing power-strips which lay on the ground to supply the same 120 Volt current.

FIG. 12 shows a preferred embodiment in which the desktop item is a lighting device having a preferred light source selected from a bulb, CFL, incandescent light, energy saving bulb or tube having a big base (12a), a rear-side of the base having three or a plurality of the outlet-unit(s) numbering from 1 to any number so it can be connected with other electric or digital data devices to supply or charge the other devices. FIG. 12 also shows a wired plug (12C) having a prong (12d) without any circuit inside so that it can deliver the wall-outlet 120 Volt direct to the three outlets of base (11a) to let people connect with a desk top laptop, speaker, lava light or other electric or digital devices which need 120 Volt AC current to operate.

DETAILED DESCRIPTION OF THE PREFERRED EMBODIMENTS

The present invention provides improvements over the sealed-units disclosed in U.S. patent application Ser. Nos. 12/502,661, 12/292,580, 12/566,322, 11/498,874, 11/527, 629, 12/622,000, and 12/624,621, which have uniform dimensions and shapes to fit into the same uniformly dimensioned compartment and thereby enable the universal sealed-unit to fit into a variety of LED light devices. This invention has more features, functions, and effects to allow people to buy any electric device or digital data device with the additional convenience of including outlet-unit(s) to supply electric power to other device(s), or USB-unit(s) to supply different types of electric power to other device(s). The current invention uses a universal module which can have any combination of the following parts or accessories, including: circuit-means, conductive-means, contact-means, receiving-means, output-ends, input-ends, electric parts and accessories, prong means, rotating means, cable means with a plug, cable means with a USB-plug, printed circuit means, flexible printed circuit means, wires, a cable, a digital data cable, a conductive plate, or any related electric parts or accessories available from the marketplace to get electric power from a prong-cable means, USB-cable means, prong means, or USB means to the outlet-unit's or USB-unit's receiving-means and supply power to a variety of electric devices.

The universal module has a same power-supplying function as the "sealed-unit" for the "LED light devices" described in the inventor's issued U.S. Pat. Nos. 8,342,732, 8,305,246, 8,002,456, 7,726,839, 7,726,841, 7,726,869, 7,618,150, and 7,722,230 and U.S. patent application Ser. Nos. 12/566,322, 12/073,889, 12/894,865, 12/003,809 or the "outlet device" of the inventor's U.S. Pat. No. 7,824,185. Furthermore, the interchangeable "sealed-unit or battery-pack" of the inventor's U.S. patent application Ser. Nos. 12/622,000 and 12/295,562 also utilize concepts shared by the present invention.

Figures 1, 2, 3:
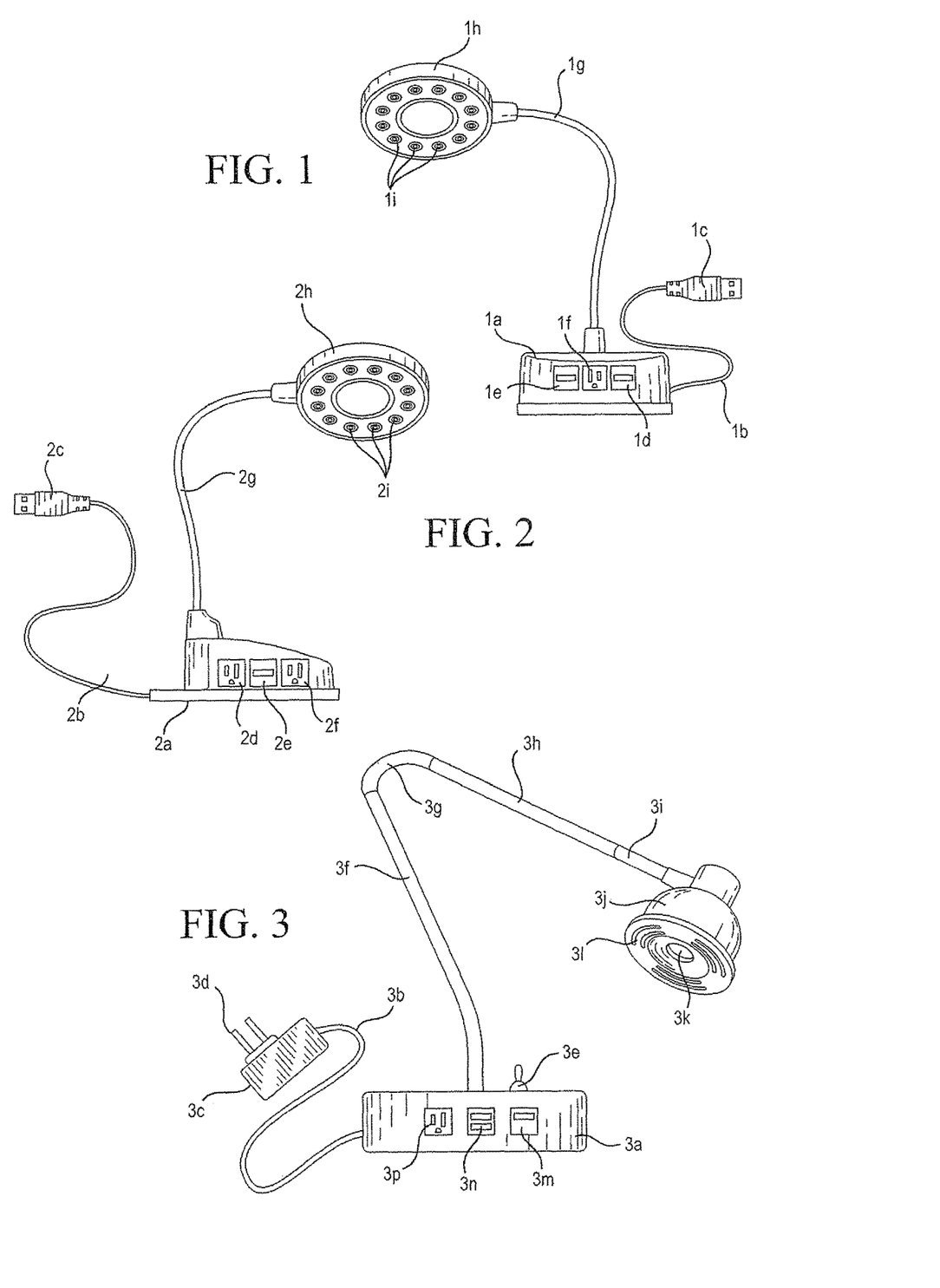
FIG. 1 is a front view of desk top items with LED means having USB-unit(s) to charge other electric or digital data device(s), according to a first preferred embodiment of the invention, which has 2 USB-units and 1 outlet-unit, 12 LEDs, and is powered by a USB plug-wire means.
FIG. 2 is a side view of the desk top items of the first preferred embodiment.
FIG. 3 shows a first design of a second preferred embodiment of the invention having 3 USB-unit(s) with different power output to charge different electric or digital data device(s), for example 500 ma, 1,000 ma, 2,100 ma output to charge different electric or digital data device(s) such as an iPhone™ and iPad™ for different requirements for charging current.

FIG. 1 is a front view of a desk top item (1a) with LED (1h)(1i) and USB-unit(s) (1d)(1e) for charging other electric or digital data device(s) according to a first preferred embodiment of the invention, which has 2 USB-units (1d) (1e) and 1 outlet-unit (1f) at the front or edge wall of the main-base or main-housing. The first preferred embodiment is a 12 LED arranged in a circle with proper space to illuminated for people reading or working desk lamp for USB light powered by a USB plug-wire (1b) (1c) and includes an adjustment arm (1g). which can bend to desired location with sealed-skin or wrap around comfortable coasting, wrapping so not show the inner bendable cheap metal material as FIGS. 1, 2, 6. Or/The adjustable arm is a rob or bar or tube which can adjustable while these solid bar(s) or rob(s) or tube (s) has joint-piece (3g) (4g)(5i) of FIGS. 3,4.5 so can adjust the front of arm LEDs illumination-unit to aim to desired locations.

From FIGS. 1, 2, 3, 4, 5, 6 desk top lamp or items has USB or outlet or other female receiving-ports is same as co-inventor's child filed case which now is U.S. Pat. No. 9,559,472 (#110)=(#TTT) U.S. application Ser. No. 13/870,253 filed on Apr. 25, 2013 and issued date on Jan. 31, 2017 for hand reachable USB charger device which publication number is 2014-032-0063 publication date on Oct. 30, 2014P, and U.S. Pat. No. 9,488,364 (#106) for USB-Desk Top items has Liquid compartment on top U.S. application Ser. No. 13/870,447 filed date on Apr. 25, 2013 and public-date on Oct. 30, 2014 and issued date on Nov. 8, 2016. Both US patented child case also has the LED light source(s) on top of the main-base which has USB or-and outlets or-and other female receiving ports.

FIG. 2 is a side view of the first preferred embodiment of a desk top item (1a) with LED (2h)(2i) showing 1 USB-unit (2e) and 2 outlet-units (2d)(2f) on the side or on edge wall face outward of the base. The LED has 12 LEDs (21) are arranged in circle or donut or other shape as (1) FIG. 15 round space arrangement, or-and (2) FIG. 3 for LED arrangement or-and (3) FIG. 16 linear or-and line arrangement, or-and (4) FIG. 17 matrix arrangement in the USB powered light (2h) and is powered from the USB plug-wire (2b)(2c).

FIG. 3 a first design of a second preferred embodiment which has 2 USB-unit(s) (3m) (3N) and an outlet-unit (3p) with different AC or-and DC power output to supply or-and charge different electric or digital data device(s). The USB-unit(s) and (3m) (3n) may be 500 ma, 1,000 ma, and 2,100 ma units and outlet-unit (3p) has outlet's AC current to charge or supply the said DC or-and AC current to different electric or digital data device(s) such as an iPhone™ and iPad™ that have different requirement for charging current. As shown in FIG. 3, power is provided by an outside transformer, adaptor, or inverter (3c) connected to a wall outlet by prongs (3d), the desk top item (3a) having two USB-units (3n,3m) and an outlet-unit (3p) with different power outputs to charge or supply power to different electric or digital data devices.

From FIG. 3 the adjustable angle arms has multiple-bars (3f) (3h) and bendable joint (3g) to make the bar (3h) to adjustable the orientation or-and angle or-and position. The front of bar (3h) (3i) has LED lamp shade (3j) to offer space for inside LED (3k) and the lamp shade (3j) has one cover or lens (3l) to adjacent to the lamp shape (3j) with openings or slots or cutouts for ventilation purpose while the desk lamp has high-power light source. From FIG. 3 show the base of desk top lamp which has the switch (3e) for preferred selection from market place to turn on and turn-off the LED light source for illumination through built-in circuitry or-and circuit(s) to make the said LED light source for desired brightness, color, functions.

Figures 4, 5, 6:
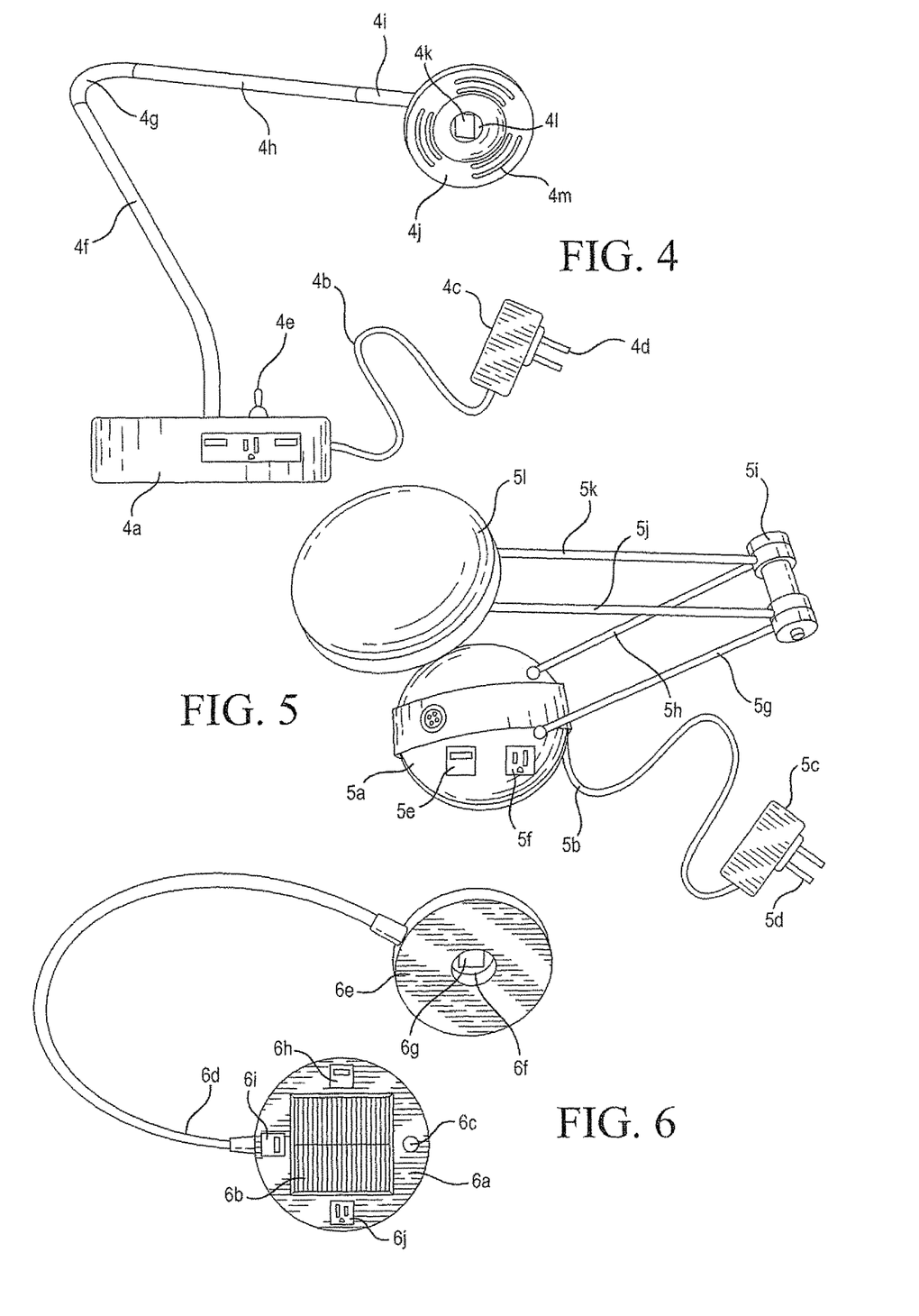
FIG. 4 shows a second design of the second preferred embodiment, which has 2 USB-units and 1 outlet-unit to allow people to charge or supply power to, for example, an iPad™, iPhone™, laptop computer or other device which can get power from the USB-units or outlet-unit.
FIG. 5 shows a third preferred embodiment of a desk top item in the form of an LED lighting fixture with adjustable arms to enable adjustment of the height, orientation, direction, and/or angle of the LED lamp to provide the best illumination. The built-in 1 USB-unit and 1 outlet-unit has a lower cost than the above-discussed items with a plurality of USB-units and outlet-units and is powered by a UL listed adaptor with a transformer plugged into a wall outlet that supplies 120 Volt AC current, rather than by a USB plug and wire.
FIG. 6 shows a fourth preferred embodiment which is powered by solar power and stores the solar electricity inside rechargeable batteries to provide enough power to charge other electric or digital data device(s) through built-in USB-unit(s) and outlet-unit(s) incorporated with proper circuit means to meet market requirements.

FIG. 4 shows a second design of the second preferred embodiment which has 2 USB-units and 1 outlet-unit included in base (4a) to allow people to charge or supply power to an iPad™, iPhone™, laptop computer, or other device which can get power from the USB-unit(s) or outlet-Unit. The design shown in FIG. 4, like that of FIG. 3, includes an outside transformer, adaptor, or inverter (4c) connected to a wall outlet by prongs (4d), as well as a bendable light pole with sections (4f to 4i), and lamp unit (4j) with vent openings (4m) and light source (4k). The drawing also shows the differences between the first and second preferred embodiments including the (i) different male-plug such as USB mail-plug (1c) (2c), AC wire with male plug (4c), AC-to-DC transformer with male plug (3c), and (ii) different light source arrangement such as FIGS. 1 and 2 for 12 LEDs in circle or donut or round arrangement, or FIGS. 3 and 4 for 1 piece of LEDs in round or other shape, or (3) Different control system such as switch or sensor. All such alternative designs, and any improvements or devices with an equivalent function or that are replaceable by the preferred items will still fall within the scope of the current invention, including variations disclosed in the inventor's other patents and patent applications may also fall within the scope of the current invention.

FIG. 5 shows a third preferred embodiment of a desk top item in the form of an LED lighting fixture (5a) with adjustable arms (5g) (5h) (5i) (5k) (5j) which is bars (5g) (5h) 95j) (5k) and adjustable-kit (5i) to make the LED light source unit (5l) to enable the LED lamp to be moved to a desired height, orientation, direction, and/or angle to get the best illumination to people. The built-in 1 USB-unit (5e) and 1 outlet-unit (5f) have a lower cost than other above-discussed USB-units and outlet-units because they do not need to be made as compact. The desk top item is powered the transformer of a UL listed adaptor (5c) (5d) that receives power from a wall outlet for 120 Volt AC current rather than the USB plug and wire of the above preferred embodiment.

From FIG. 5 the LED desktop light because has move the built-in AC-to-DC circuit (not shown) and use the outside LED desk lamp transformer (5c) so the big-size base will have plenty of space to install the bigger-size or more-number of the said USB-unit(s)(5e) or-and Outlet-unit (5f) and other sensor, switch as FIG. 5 show the 4 types switch inside double-circles which can be color, brightness, timer, motion sensor selection to adjust the color, brightness, time delay or motion or no-motion sensor functions. The said outside LED desk lamp transformer (5c) may has male-plug (not shown) to insert LED desk lamp female receiving ports (not shown) to build the electric delivery or just direct has wire (5b) to connect with inside circuit(s) as predetermined design. From the FIG. 5 the bar or rod or tube (5g) (5h) (5j) (5K) is not bendable and all bar or rod or tube has rotating-joint piece (5i). To make the lower tube-assembly (5g) (5h) to change relative orientation or direction or position with top tube-assembly (5K) (5j) so can make the said LED light-unit (5l) to desired distance, heights, position and aim to desired location for people to reading and working.

FIG. 6 shows a fourth preferred embodiment which is powered by a solar power array (6b) and which stores the solar electricity inside rechargeable batteries (not shown) that have enough power to charge other electric or digital data device(s) though the built-in USB-unit(s) (6i) (6h) and outlet-unit (6j) having appropriate circuit to meet market requirements. The desk top item of this embodiment also includes a lamp pole (6d) and light source (6g) included in an opening (6f) in lamp unit (6e). From FIG. 6 the USB port (6i) which is installed on the adjustable arm (6d) base. And base is solid-piece and is raised piece same as (8e) of FIG. 8, and as (14t) of FIG. 14 with big details drawing which have USB-unit (14g) (14h), or-and outlet-unit (14i) (14j, or-and adjustable or selectors (14e) (14f,) or-and camera (14c), or- and motion sensor (14e), or-and speaker (14d). The details big-drawing show that the arm-base has enough space to install the USB-port (6i). The adjustable arm (6d) is bendable and flexible to stay one desired angle and height.

Figures 7, 8:
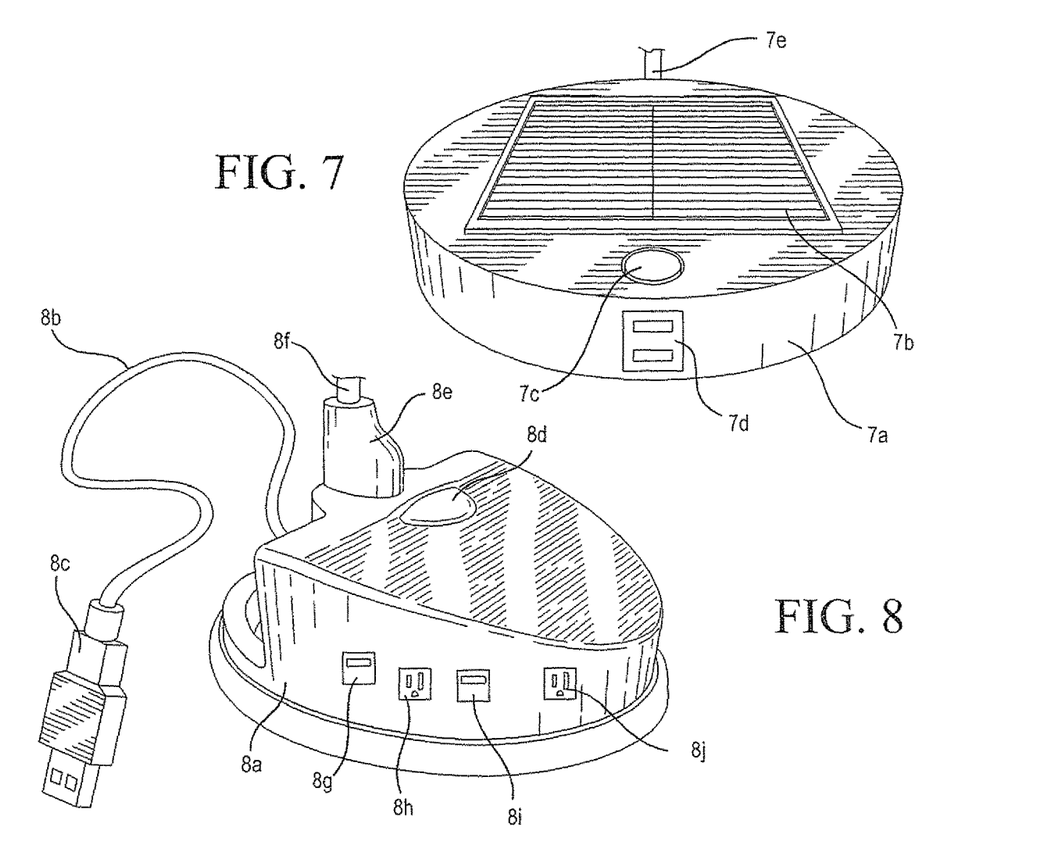
FIG. 7 shows the fourth preferred embodiment, which can also be powered by wind power, chemical power, battery power, a generator, transformer, adaptor, inverter, inductor, etc.
FIG. 8 shows the first preferred embodiment, which has a thicker or higher base to provide a bigger space to arrange bigger size electric parts and accessories to save the cost of super compact, slim, or cute electric parts and accessories, and which also can load a rotating USB-unit(s) or a rotating USB-Module so that a first surface of the USB-module will look nice when the USB-unit(s) or USB-Module is not in use. Details of the rotating USB module are shown in FIGS. 18, 19, 20, 21, and 22

FIG. 7 also shows the fourth preferred embodiment of a desk top item (7a) and USB module (7d), which can be powered by a solar panel (7b) or other available power sources from input conductive-wire (7e) including wind power, chemical power, battery power, a generator, a transformer, adaptors, an inverter, an inductor, etc., and which may further include a switch (7c) and lamp post (7e) corresponding to the one shown in FIG. 6. As illustrated, the large base (7a) includes a solar power array (7b), an on/off switch (7c), USB outlet (7d) with two ports, and a lamp pole (7e). From FIG. 7 also show the switch (7c) which can be any kind from market available type.

Figure 9:
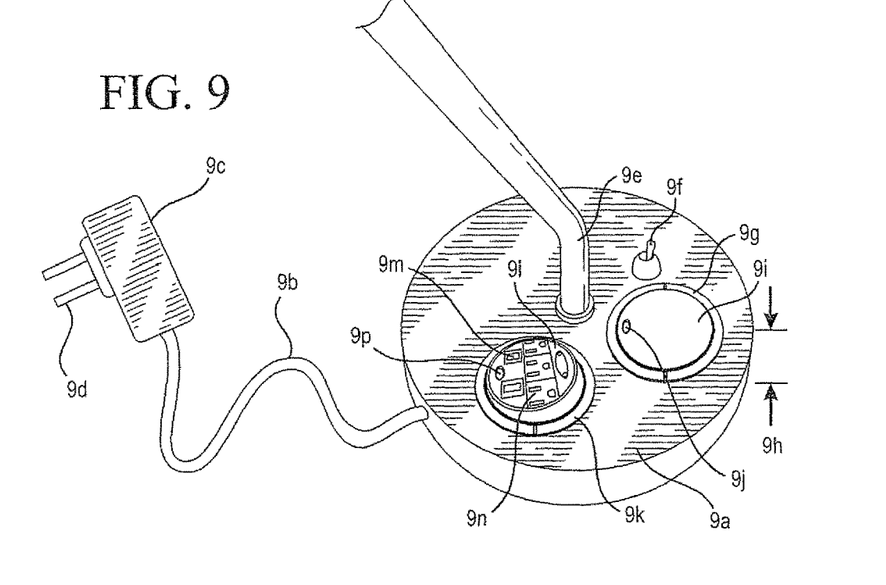
FIGS. 9, 10, 11, and 12 show fifth and sixth preferred embodiments in which desk top items with LED means also have a thicker or higher base, and which can add rotating USB-modules with a plurality of USB-unit(s) and a plurality of other receiving means to increase the number of function(s), feature(s), effect(s), and/or performance(s), the USB-module having more than 1 surface and the capability of changing the surface for different purposes.

FIG. 8 shows that the base (8a) of the desk top item of the first preferred embodiment may be made thicker or higher base or housing (8a) to accommodate bigger size electric parts and accessories to save a lot of the cost of super compact, slim, or cute size electric parts and accessories. The base (8a) accommodates USB units (8g,8i) and outlet units (8h,8j) as well as a switch (8d) and a lamp pole mount (8e) for lamp pole (8f). Power may be supplied by a USB plug (8c) and cord (8b) although, as in all embodiments of the invention, the power supply is not limited to the illustrated power supply. Furthermore, the thicker or higher base or housing (8a) can also accommodate rotating USB-unit(s) or USB-modules, as illustrated in FIG. 9, including modules (9i,9l) that includes USB ports (9m), outlets (9n), and indicator light (9p), and which are mounted in compartments (9g,9k) in a large side base also having a switch (9f). Power in the illustrated embodiment of FIG. 9 may include a transformer or adaptor (9c) with prongs (9d) and power cord (9b) and the lamp (not shown) may be mounted on a pole (9e). The USB modules (9i,9i) can be rotated from a first surface to a second surface upon pressing of lock/release button (9j) so that the first surface of the USB-module will look nice when the USB-unit(s) or module is not in use. all down. Details of the rotating USB module can be understood from FIGS. 18, 19, 20, 21, and 22, the details of which are explained in the inventor's copending U.S. patent application Ser. No. 13/117,227. It will be appreciated that the details disclosed in the copending application may be applied to the present embodiments without departing from the scope of the current invention.

FIGS. 9, 10, 11, and 12 (described in more detail below) show fifth and sixth preferred embodiments which also have a thicker or higher base for the desk top items with LED(s) light-source, and to which rotating USB-modules (9i) with rotating rim (9k) having a plurality of USB-unit(s) (9m) and outlet-unit (9n) and other receiving ports (9p) can be added to increase the number of function(s), feature(s), effects, and/or performance(s). The USB-modules (9i) to (9m), (10(g), and (11e) to (11f) of these embodiments have more than 1 surface to enable different surfaces to be exposed for different purposes. The more than 1 surface of the USB-module can be any number from 2 to N. From FIG. 9 show the main-base (9a) has two rotating USB-unit (9i) one is show the cosmetic appearance surface which has one mechanical locker (9j) to allow pop-out the other surface(s), and the other one show the multiple receiving-ports surface has USB-unit (9m) and outlet-unit (9n) and other port (9p) to offer desired USB or-and outlets or-and other receiving-ports functions with outside transformer to supply DC power into inner circuitry or electric parts to offer operation current to LED(s), USB-unit(s), Outlet-unit(s), other built-in additional functions except the lighting.

Figure 10:
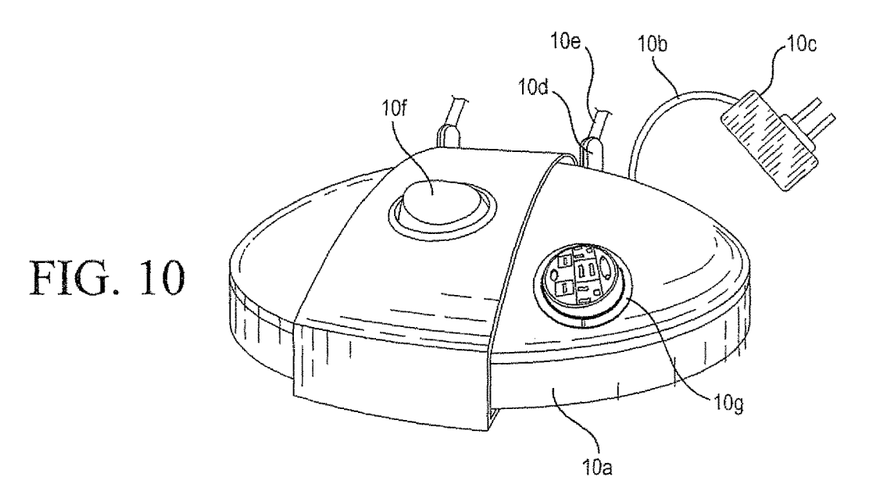
Figures 11, 12:
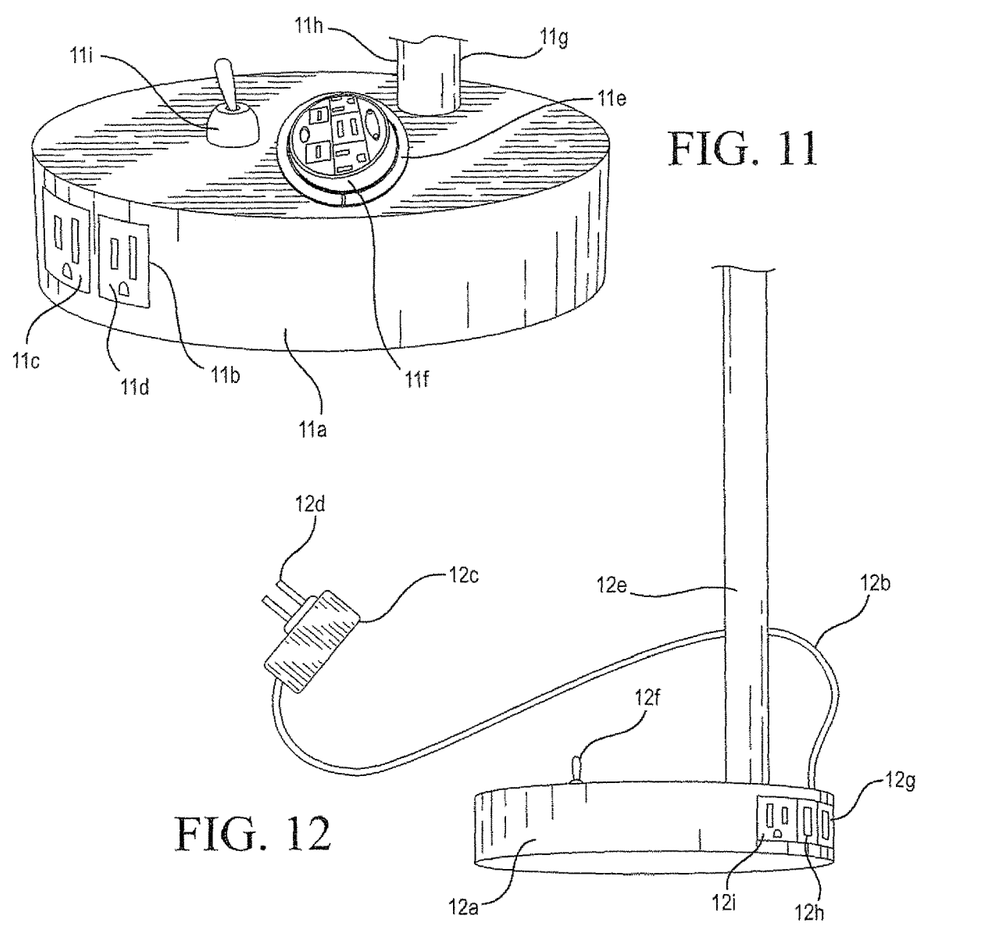
Figure 15:
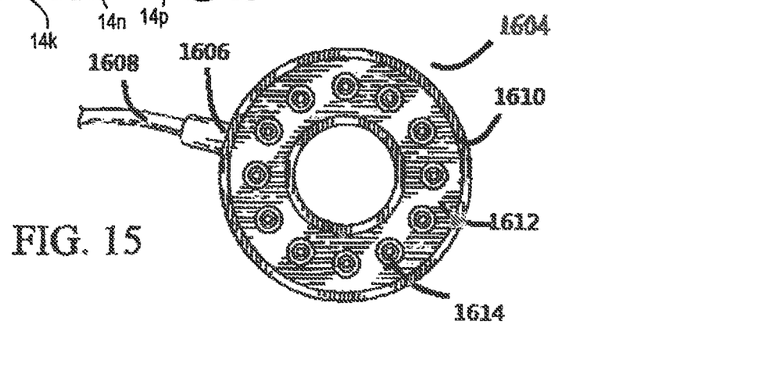
FIGS. 15, 16, and 17 show different LEDs means used for LED lighting in the above-discussed preferred embodiments or other desk top items.
Figure 16:
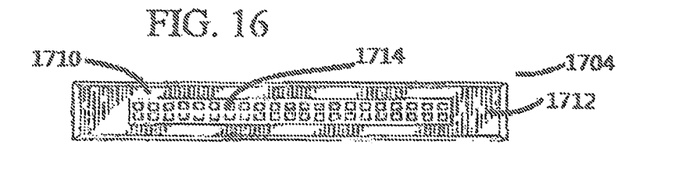
Figure 18:
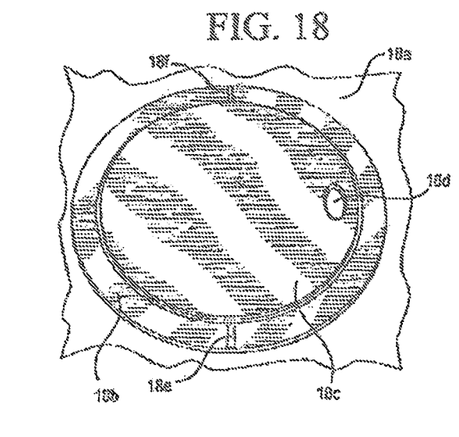
FIGS. 18, 19, 20, 21, and 22 show details of a USB-module with at least one USB-units and a plurality of additional receiving means such as USB-unit(s), outlet-unit(s), Internet-unit(s), adaptor-unit(s), other light means, or other light sources with appropriate parts and accessories.
Figure 19:
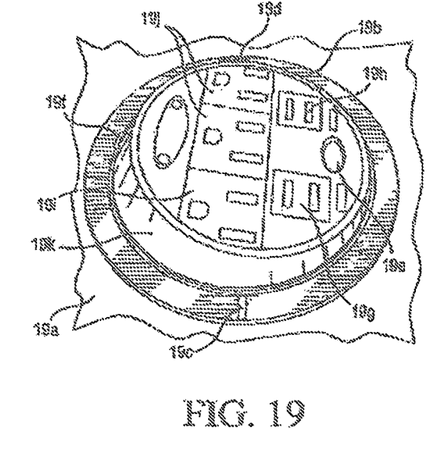
Figure 20:
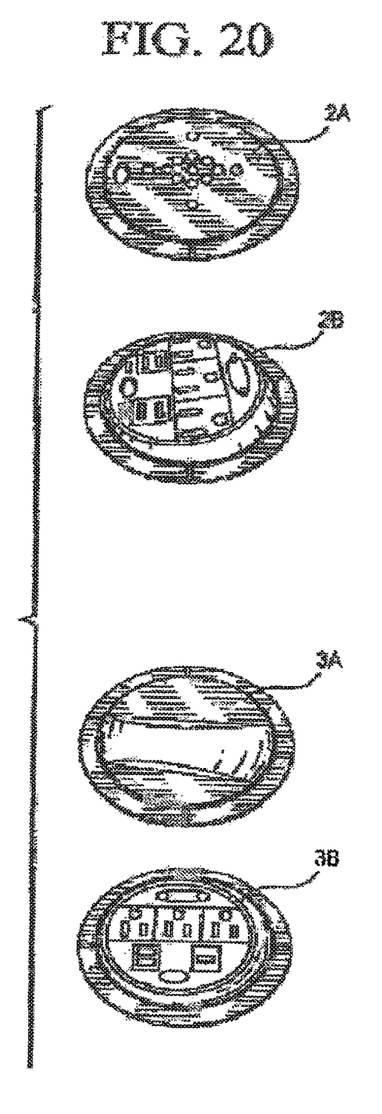
Figure 21:
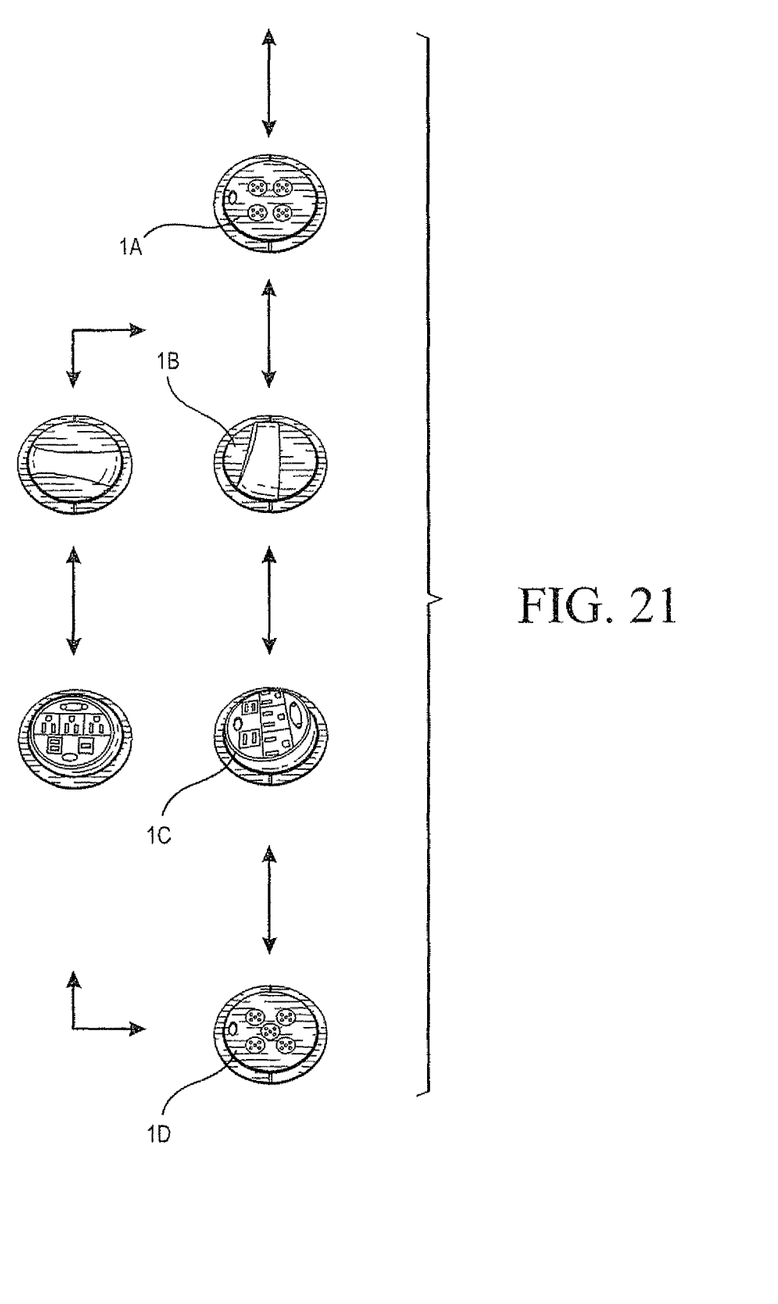
Figure 22:
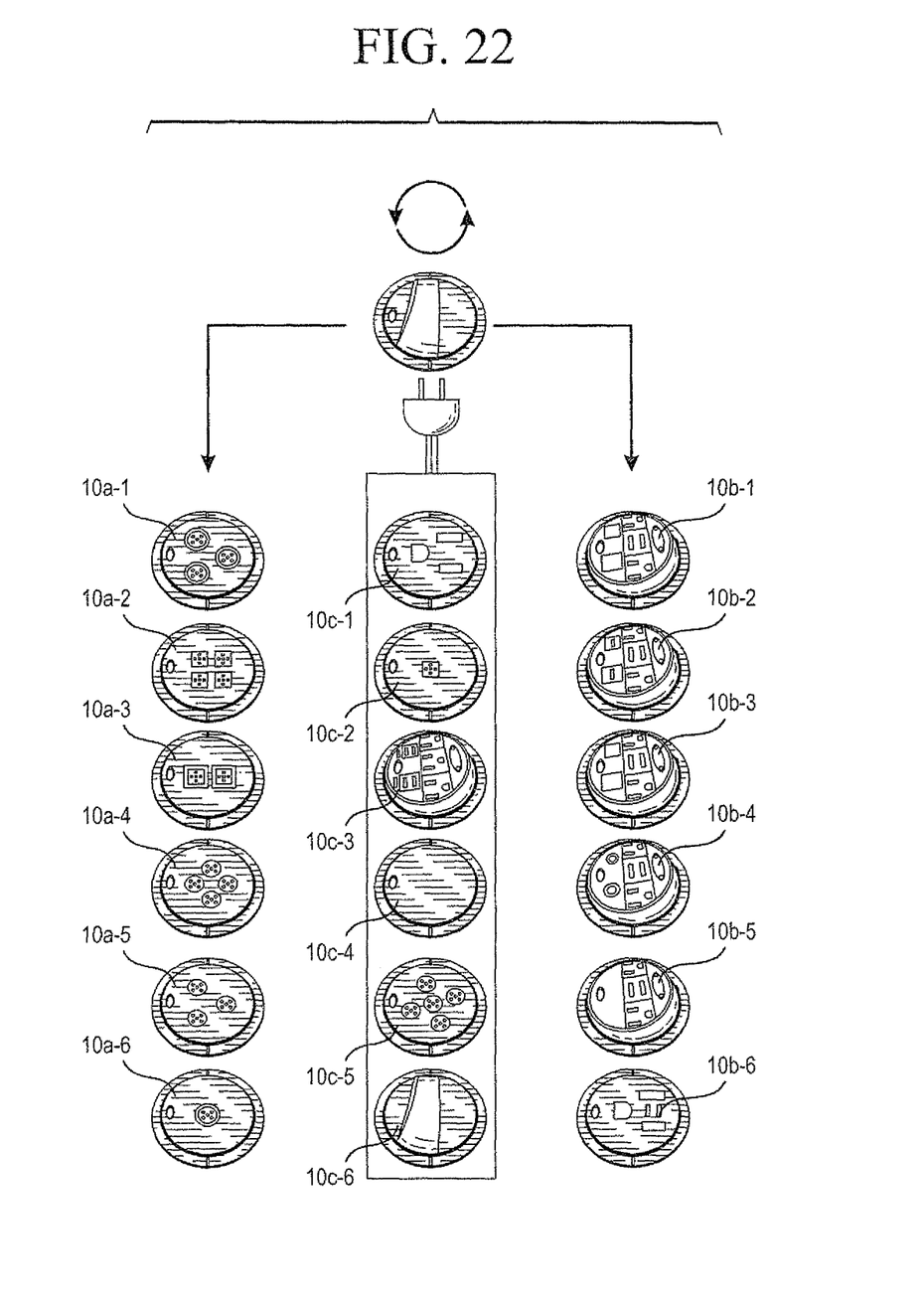

From FIG. 10 and FIG. 11 and FIG. 12 show the different construction for the adjustable angle arm (10d) (11g) (12e) those are solid tube or bar 10 or rod as the above discussed desk lamp FIG. 5 and FIG. 4 which has adjustable angle-kits (5g) (4i) so can still adjust the solid piece tube, arms, rod, bars assembly to aim the LEDs light source to illuminate the desired area depend on which type of LEDs arrangement selection including linear as FIG. 16, rows as FIG. 16, array as FIG. 18, matrix FIG. 18, donut as FIG. 15, circle as FIGS. 1,2, LEDs as (3k) (4k) of FIG. 3 and FIG. 4 arrangement of plurality of LEDs.

Figure 24:
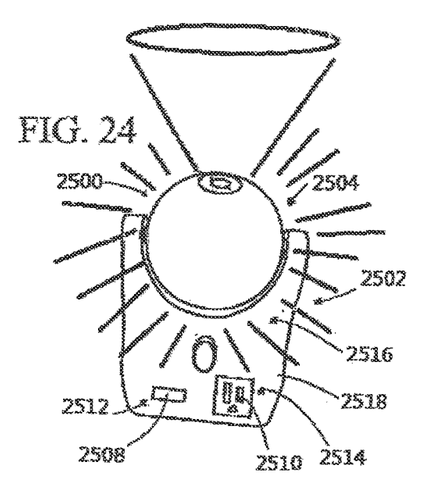
Figure 25:
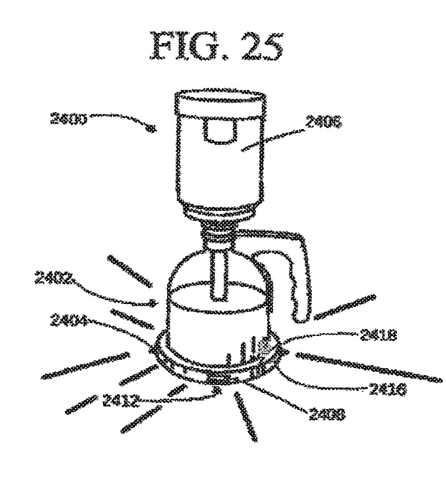
Figure 26:
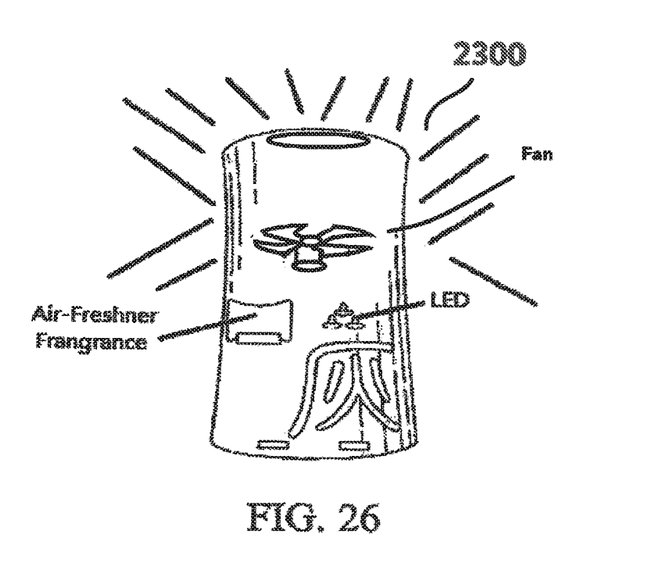
Figure 27:
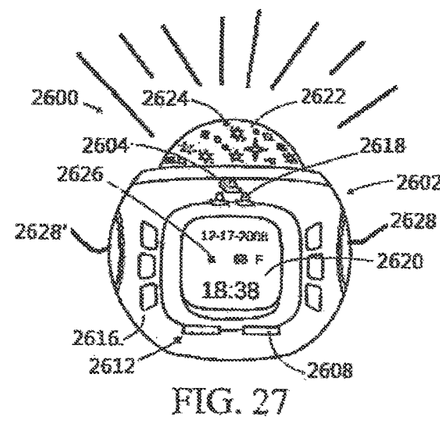
Figure 28:
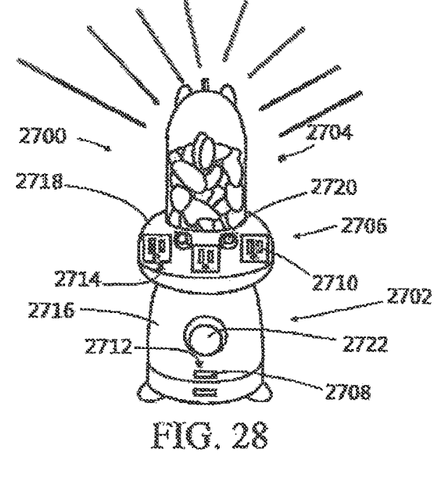
Figure 29:
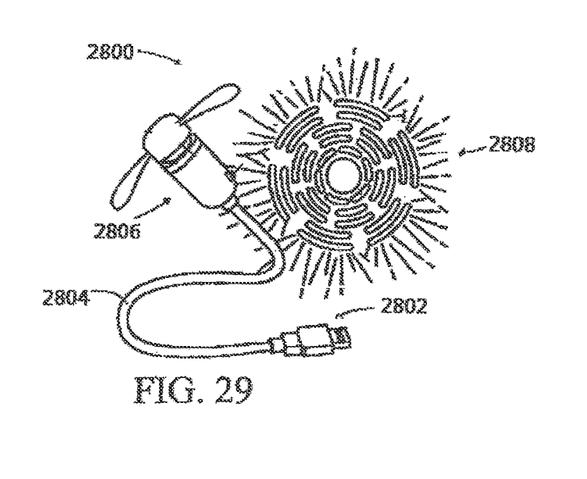

From FIG. 10 and FIG. 12 show the input power is DC current from outside AC-to-DC transformer (10c) (12c) which connect with the main-base (10a) (12a) female receiving-ports to supply the DC current into the said LED desk lamp for power need for (1) LEDs (2) USB-units (3) other built-in LED desk lamp DC power addition or existing functions as shown on the FIG. 24 for projection function, or FIG. 25 for drink functions, FIG. 26 for air-freshener, FIG. 27 time piece, FIG. 28 food supplier function, FIG. 29 fan or ventilation or heater or moving or changeable light or LED light show functions.

From FIGS. 10, 11, 12 show the different switch (10f) (11i) (12f) to control the LED light or additional added-on functions to operate. The said switch (10f) (11i) (12f) also can be electric switch including all kind of sensor or remote controller.

Figure 13:
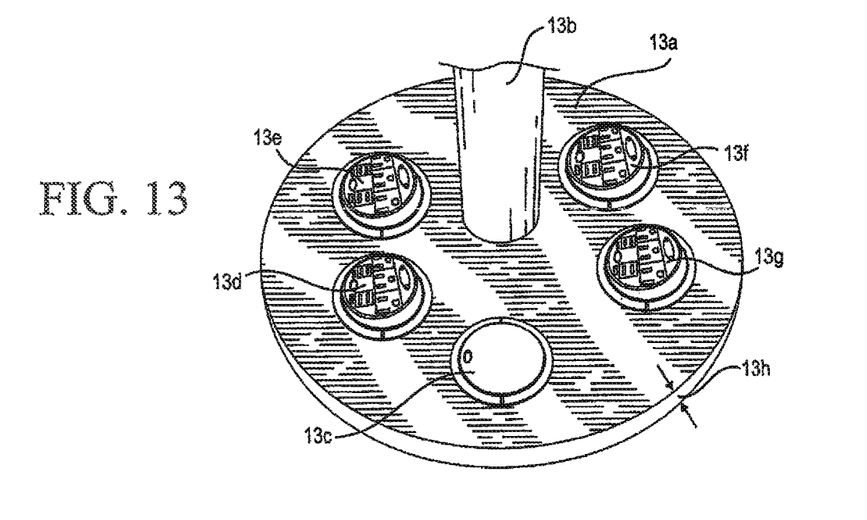
FIG. 13 shows a desk top item which has a super big base size so that a plurality of rotating USB-modules can be installed to enable a group of people to charge their electric or digital device(s) at the same time. Such a simultaneous charging arrangement may be used in a train station, a bus station, an airport, a meeting room, a hotel lobby . . . etc.

FIG. 13 shows a desk top item (13a) which has a super big main-base (13h) so that a plurality of rotating USB-Modules (13c) to (13g) can be installed to enable a group of people to charge their electric or digital device(s) at the same time, such as in a train station, bus station, airport, meeting room, hotel lobby . . . etc. From FIG. 13 while not use can rotate the rotating-unit to value and nice and net surface (13c) and while need to use all kind of female ports can just touch the locker (small oval shape unit) to let desired surface of female ports assembly pop-out and change to desired one from two or plurality of surfaces.

Figure 14:
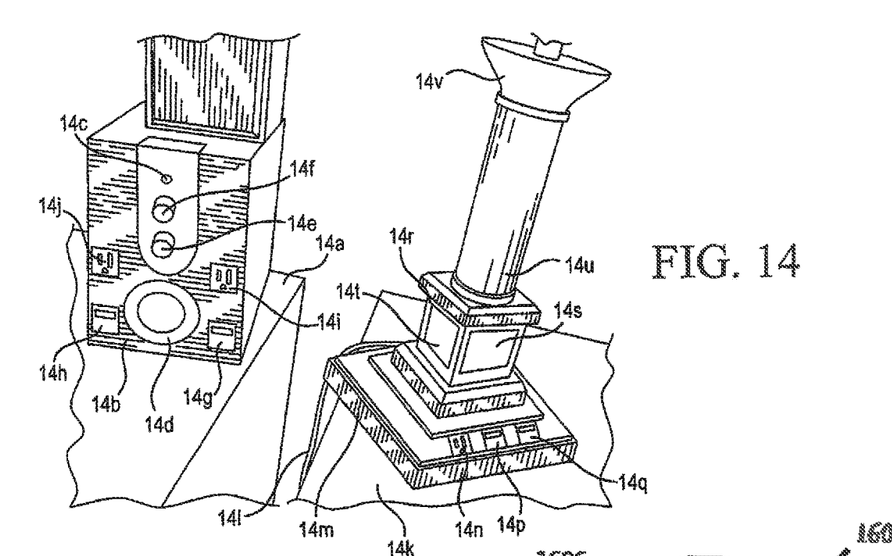

FIG. 14 shows desk top lamp main-base (14m) has LED indicator light (14c) and USB-unit(s) (14h)(14g)(14p)(14q), USB-module(s), or outlet-unit(s) (14i)(14j)(14n) to allow people to get or charge other electric or digital device(s), the items including added-on other functions may selected from group combination from a radio, timepiece, weather station display, fruit blender, food machine, liquid machine, LED lighting, light fixture, projector means, electric fan, heater or any conventional items with LED means built-in. The FIG. 14 has magnified size to show details for the arm-base (14a) and top LED lighting-shade holder (14v) and the arm-base (14a) has Sensor (14c) or-and adjustable or selective switch (14e) (14f), or-and Speaker (14d), or-and USB-units (14g) (14h), or-and Outlets (14i) (14j), or-and movable cover (14b). the said arm-base which can be a compartment which is permanently install or detachable construction.

From FIG. 14 show the Arms (14r) (14s) (14t) (14u) which form an arm on vertical-axis to get close people shoulder height as above discussed. The current arm(s) (14r)

(14s) (14t) (14u) and main-base (14m) is one of alternative or equal function of replaceable embodiment for higher base such as above discussed higher cone or tower main-base, so no need longer arms on vertical-axis. From side magnify drawing can see the similar cone or tower main base which is formed by (14m) and (14r) (14s) (14t) (14u) which can install all kind of application as above discussed, furthermore it can install additional functions unit which show on the FIGS. 23,24,25,26,27,28 and all these functions including below listed added-on so become built-in desk lamp or items has the functions which is one or more than one of (a) light beams, (b) a projected image, (c) a time image, (d) a clock, (e) illumination, (f) music, (g) AC power source, (h) electric signals, (i) photos, (j) digital signals, (k) air flow at a desired temperature, (l) moisture, steam, (m) smells, (n) liquid, (o) coffee/tea, and/or (p) food, or to serve as any other conventional device that people will stay around for period of time while their other devices are charging.

Figure 17:
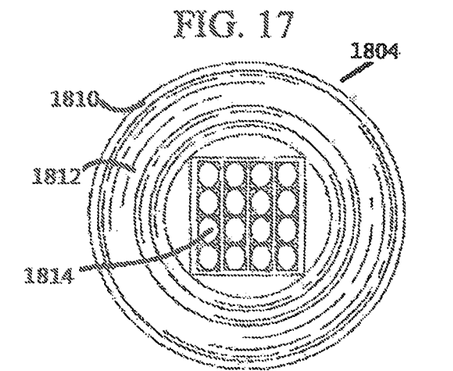

FIGS. 15, 16, and 17 show different LEDs used for LED lighting to provide area illumination in the above-discussed preferred embodiments or other LED desk lamp or LED lamp for a desk top.

FIGS. 18, 19, 20, 21, and 22 show details of a USB-Module (18b)(19b) with at least one USB-unit (19g) and a plurality of additional receiving means, which may include a USB-unit(s) (19h), outlet-unit(s) (19i)(19j), internet-unit(s), adaptor-unit(s), other light means, or another light source with appropriate parts and accessories, or any conventional available receiving means, the USB-module having at least more than 2 surface(s) (e.g., surface (18c) on one side and the USB-unit(s) on the other side), each surface with its own special design.

FIGS. 23, 24, 25, 26, 27, 28, and 29 show all kinds of desk top items or-and LED desk Lamp which offer function(s), effects(s), performance(s) to people's eyes, nose, mouth, and ears so that people can stay nearby for a period as they work, rest, sleep, or stand. The desk top items each have LEDs and USB-unit(s) to charge other electric or digital data device(s) and are arranged to generate, exhibit, or provide (a) light beams, (b) a projected image, (c) a time image, (d) a clock, (e) illumination, (f) music, (g) a AC power source, (h) electric signals, (i) photos, (j) digital signals, (k) air flow at a desired temperature, (l) moisture, steam, (m) smells, (n) liquid, (o) coffee/tea, and/or (p) food, or to serve as any other conventional device that people will stay around for a period of time while their other devices are charging.

Figure 23:
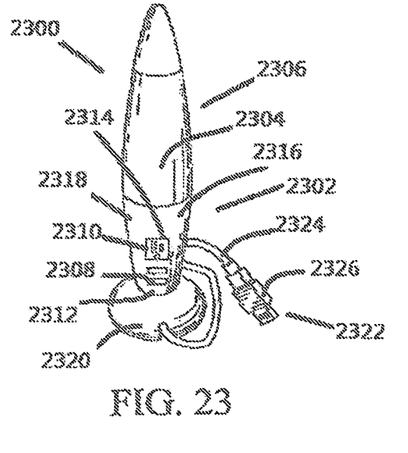
FIGS. 23, 24, 25, 26, 27, 28, and 29 show all kinds of desk top items which offer function(s), effects(s), and/or performance(s) to people's eye, nose, mouth, and/or ears for a period while people are working, resting, sleeping, or standing.

From FIG. 23 show the desk top items (2300) is one of the Liquid light application s which has base (2320) top has cone or collar or tube like compartment (2318) has built-in circuitry to get outside power from male plug (2326) and wire (2324) to input the AC or DC power source into inner circuitry to supply the power to built-in USB-ports (2308) or-and outlet-unit (2310) and inner LED(s) (not shown) and the top is liquid container (2304) which has desired inner liquid or-and optics-units to make the LED light beam to emit sufficient brightness basing on market requirement for reading or accent light or night light.

From FIG. 24 show the desk top items (2504) which has the LED(s) inside to offer the top project image or-and lighted pattern functions and supply LEDs for ball illuminations or-and light beam to make surrounding areas for reading. The said main-base (2502) is like tower or twin-tower (2516) shape with center big radius so allow the top ball (2500) can be rotating to change the project light image or-and light patterns presentation location.

From FIG. 25 show the desk top lamp or items has liquid supplier functions or warmer for liquid items. One of embodiment is the mini coffee brewer equipment. The main-base or main-housing (2400) has the built in USB-port (2412) which can charge or supply the current to other electric or digital data device.

From FIG. 26 show the smell device which is one of desktop item or lamp which has proper space to install the said smell related device which including (1) air-freshener (2) fragrance dispenser or vaporizing unit (3) air-purifier (4) moisture absorber unit (5) liquid fragrance device (6) bug replier smell device and the smell can come out from openings or holes or slot as shown. The inside also has built-in plurality LEDs to make the whole or top or partial desk top item to supply desired light brightness, color, changing color, chasing light, fade-in or fade-out light while LEDs incorporate with IC and related electric parts and accessories and switch or-and sensors.

From FIG. 27 show the LED desk top item or lamp (2600) has built-in LEDs (2604) (2608) to offer the pin-hole image or lighted-pattern projection though the top shaped holes (2622) (2624) which is same as co-inventor (#GG-2008) U.S. Pat. No. 8,231,260 for Pin Holes imaging. Some of the plurality of LEDs (2618) (2604) also offer the brightness to front displayer (2626) to show time/date/week/year or-and temperature or whether status (2620). The main-base (2602) has variety of switch, sensor, remote controller receiver (1612) to make all setting, selection of the LED color, brightness, function selection, brightness selection, sensor selection of the built-in LEDs for top pin-hole image projection or-and the body glow light brightness and colors. The said main-base (2602) also has the 2 speakers (2628) (2628') he said the desktop item or desk top lamp which has its preferred vertical-height or-and horizon-width so can allow the body glow light brightness can cover desired areas for people reading or work. The said main-base 2602 also has built-in USB ports (2612) (2608) to connect with circuitry and power source to supply or charge other outside device or even can charge inside built-in rechargeable batteries by desired type and size and specification USB-ports selections.

From FIG. 28 show the food supplier device (2700) for desktop item or lamp. The food supplier device can be an individual product put on desktop as desktop item which has main-base (2716) which has built-in USB-ports (2712) or sensor, switch (2722) and can let people get the food, candy, cookie or chocolate or other food from the food supplier device (2700). It is appreciated the food supplier device is not limited for its size or tall or width. This depends on where to put.

From FIG. 29 show the air-flow device (2800) which supply desired air-flow for hot, cold, warm, or just normal air-flow to people. The said air-flow device can offer people not only for LED desk top lamp with desired light illumination but also has the air-flow with preferred air for desired temperature. The said air-flow device has the blades From FIG. 29 show the air-flow device (2800) on its main-base and main-base (2806) has wire or bendable-arm (2804) to connect with male plug (2802) which can be a (AA) USB male plug, or (BB) AC male-plug, or (CC) conductive wire to connect with desktop item or lamp power source which depend on which power source want to connect with.

The desk top items, which include LED means or an LED device, are items that are used in locations where they can be easily reached, touched, operated, or managed by people, i.e., in locations or places nearby where people will stay for period of time, such as a desk, table, bed, chair, land, grass, or wherever else people like to work, rest, sit, stand, or a take nap.

As noted above, the desk top items may offer electric signals to carry out functions such as (aa) illumination as FIGS. 1,2,3,4,5,6, 23,24,25,26,27,28, or-and (bb) sound as FIG. 14,27, or-and (cc) images as FIG. 24, or-and (dd) brightness, visual effects as FIGS. 1,2,3,4,5,6, 23,24,25,26, 27,28, or-and (ee) smell as FIG. 26, or-and (ff) water, liquid, food as FIG. 25, or-and (gg) wind, moisture, airflow as FIG. 29, or-and or any conventional functions of electric devices with built-in LEDs means, such as LED lighting, a clock as FIG. 27, projector machine as FIG. 24, film, digital photo frame, time display as FIG. 27, air freshener as FIG. 26, electric perfume freshener as FIG. 26, moisturizer as FIG. 26, electric fan as FIG. 29, electric heater, electric steam spreader, electric cooler, electric air conditioner, or other conventionally available items that can be placed to or add-on the said LED desk lamp to let people easily reach, touch, operate, or manage the items.

The desk top items may be powered by a direct current (DC) power source such as FIGS. 1,2,3,4,5,6,10,12 from outside transformer, or alternating current (AC) power source having appropriate AC-plug wire or electric parts and accessories or components, such as circuit, IC, sensor, a motion sensor, timer, time delay, timer, resilient kits, conductive kits, transformer, inverter, adaptor, wire, prong, UL listed adapter, PIR, infrared kits, master power control kits, and/or AC power outlet-unit(s) to offer electric power at a voltage (Volt) and amperage (Amp or ma) sufficient to achieve a desired charging time. The USB-unit(s) only serve as a power source for charging other electric or digital device(s) and do not have an electric data transfer function. If a plurality of USB-units is provided, the USB-units can be arranged to have different output power to charge different electric or digital data device(s). If additional outlet-units are provided the outlet-units may be AC outlet-unit(s) that serve as an AC power source.

Electric or digital data device(s) that may be charged by the USB-unit(s) include an MP3 or MP4 player, smart phone, computer, iPhone™, iPad™, video game, digital visual equipment, communication equipment, and other consumer electric products.

The USB-unit or USB-module of the preferred desk top items may be turned on or turned off for a predetermined time by switch, sensor, timer, photo sensor, motion sensor, time delay, and/or master control power system.

All electrical connector or plug receiving port(s) in the desk top items, including USB-units or USB modules, outlets, adaptor-hole, transformer-ports may have a removable cover to allow kids or others to safely touch the items and prevent dust, or water from getting into the receiving means.

The USB-unit or USB-module to charge other electric or digital device(s) can be removable from the desk top items and carried with people to use when people leave the desk top items. For this purpose, the USB-unit(s) or USB-module(s) can be disassembled from the desk top items and re-assembled into the said desk top items by a quick connector or adaptor, or assembly or fixing kits for assembling or fixing the USB-units or modules to the desk top items, with each of the USB-unit(s) or USB-module(s) having its own safety certification(s) so that the individual USB-unit(s) or USB-module(s) can be tested by safety authorities and sold separately with safety certification or marking.

The USB-unit(s) includes an electric charging unit which has a USB-female receiving ports to receive a USB-male prong to deliver electric power from the USB-female receiving ports to the other device's USB-male prong. The preferred USB-female receiving ports gets power from a power source and uses its circuit to convert or transform the electric power to a desired waveform, voltage, and current enough to charge other electric or digital device(s).

The items of these embodiments may be in the form of LED lighting, an LED desk lamp, LED table lighting, LED lava light, LED projection light, LED time piece, LED electric fan, LED air freshener, LED indicator coffee machine, LED indicator sound device, and LED visual device.

I claim:

1. A non-portable desktop LED reading light, comprising:
    at least one USB unit to supply electric current to other products;
    at least one LED assembly having an arrangement of a plurality of LEDs controlled by at least one integrated circuit, conductor, or switch to control color and brightness for providing reading illumination from on top of an adjustable arm; and
    a device included in said non-portable desktop LED reading light that is, or is configured to perform, at least one:
    (1) area illumination,
    (2) a charging status signal,
    (3) an airflow function,
    (4) an LED time display by LED segments,
    (5) an image display or projection,
    (6) a timepiece,
    (7) an LED candle set, and
    (8) a night light,
    wherein the more than one USB-unit fits within the desk top LED light and includes circuitry for converting an input DC from a transformer into at least one USB charging output current of not less than 1.0 A and a voltage of 5V to charge the other products, and
    wherein the at least one USB unit is configured to be fixed on a back, contour, or arm of the desk top LED light.

2. A non-portable desktop item, comprising:
    at least one USB charger having at least one USB charging-port to charge at least one other electric or digital device;
    at least one LED assembly having an arrangement of a plurality of LEDs for providing reading illumination from on top of an adjustable arm and
    a device included in said non-portable desktop LED reading light that is, or is configured to perform, at least one of:
    (1) area illumination,
    (2) a charging status signal,
    (3) a message display,
    (4) a lighted image,
    (5) an image display or projection,
    (6) a timepiece,
    (7) a weather station display,
    (8) an integrated circuit controller for the at least one LED assembly, and
    (9) a night light; and
    at least one of an integrated circuit, conductor switch, or sensor for controlling at least one of a function, brightness and color of the plurality of LEDs,
    wherein the USB charger fits within a desktop item housing and is powered by at least one of (a) an external AC-to-DC transformer, and (b) an external DC power source through a USB wire.

3. A non-portable desktop item, comprising:
    at least one built-in USB unit or USB module having at least one USB charging port to charge at least one other electric or digital device;

at least one LED assembly having an arrangement of a plurality of LEDs for providing (A) at least one of an image, message, time; projection and display function, and (B) at least one of the following functions:
(1) area illumination,
(2) a charging status signal,
(3) a message display,
(4) a lighted image display,
(5) an image display or projection,
(6) a timepiece,
(7) at least one electric candle function, and
(8) a night light; and
at least one integrated circuit for controlling, setting, selecting, or adjusting (a) at least one of a brightness and color of at least one of the LEDs, (b) a switch or sensor system, or (c) one of said functions.

4. A non-portable desktop LED light as claimed in claim 1, wherein the LED light further includes at least one battery or batteries power to operate the timepiece during a power failure.

5. A non-portable desktop item as claimed in claim 2, wherein the LED light further includes at least one battery or batteries power to operate the timepiece or a clock during a power failure.

6. A non-portable desktop item as claimed in claim 3, wherein the LED light further includes at least one battery or batteries power to operate the timepiece or a clock during a power failure.

7. A non-portable desktop LED light as claimed in claim 1, further comprising one of a quick connector, adaptor, wire, USB wire assembly device and fixing device for enabling the at least one USB unit or USB module to be disassembled from the a housing of the desktop LED light and assembled back to the housing.

8. A non-portable desktop LED item as claimed in claim 2, further comprising one of a quick connector, adaptor, wire, USB wire assembly device and fixing device for enabling the at least one USB charger to be disassembled from the a housing of the desktop LED light and assembled back to the housing.

9. A non-portable desktop LED item as claimed in claim 3, further comprising one of a quick connector, adaptor, wire, USB wire assembly device and fixing device for enabling the at least one built-in USB unit or USB module to be disassembled from the a housing of the desktop LED light and assembled back to the housing.

10. A non-portable desktop LED light as claimed in claim 1, wherein a DC voltage for at least one of (1) said plurality of LEDs, and (2) a trigger system, is different than a DC voltage for USB charging.

11. A non-portable desktop LED light as claimed in claim 1, wherein the LED light includes LEDs for at least one of an LED reading light, LED night light, and LED accent light.

12. A non-portable desktop item as claimed in claim 2, wherein the LED light includes LEDs for at least one of an LED reading light, LED night light, and LED accent light.

13. A non-portable desktop item as claimed in claim 3, wherein the LED light includes LEDs for at least one of an LED reading light, LED night light, and LED accent light.

* * * * *